(12) United States Patent
Huang et al.

(10) Patent No.: US 12,015,555 B1
(45) Date of Patent: Jun. 18, 2024

(54) ENHANCED SERVICE NODE NETWORK INFRASTRUCTURE FOR L2/L3 GW IN CLOUD

(71) Applicant: Cisco Technology, Inc., San Jose, CA (US)

(72) Inventors: Xurui Huang, Shanghai (CN); Bo Sun, Shanghai (CN); Yuefeng Jiang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/344,381

(22) Filed: Jun. 29, 2023

Related U.S. Application Data

(60) Provisional application No. 63/494,413, filed on Apr. 5, 2023.

(51) Int. Cl.
| | |
|---|---|
| *H04L 45/745* | (2022.01) |
| *H04L 45/28* | (2022.01) |
| *H04L 45/76* | (2022.01) |
| *H04L 49/00* | (2022.01) |

(52) U.S. Cl.
CPC ............ *H04L 45/745* (2013.01); *H04L 45/28* (2013.01); *H04L 45/76* (2022.05); *H04L 49/70* (2013.01)

(58) Field of Classification Search
CPC ....... H04L 45/745; H04L 45/28; H04L 45/76; H04L 49/70
See application file for complete search history.

(56) References Cited

U.S. PATENT DOCUMENTS

| | | | |
|---|---|---|---|
| 2009/0213859 | A1 | 8/2009 | De Silva et al. |
| 2014/0307744 | A1 | 10/2014 | Dunbar et al. |
| 2019/0199587 | A1 | 6/2019 | Mudigonda |
| 2021/0051077 | A1* | 2/2021 | Dempo .................. H04L 41/12 |
| 2021/0392069 | A1 | 12/2021 | Thoria et al. |

FOREIGN PATENT DOCUMENTS

CN 115941456 4/2023

* cited by examiner

*Primary Examiner* — Abdulkader M Alriyashi
(74) *Attorney, Agent, or Firm* — Polsinelli P.C.

(57) ABSTRACT

Disclosed herein are systems, methods, and computer-readable media for managing Layer 2 (L2) and Layer 3 (L3) policies. Traffic is routed from a first VM to a first CGW within a Service Node, where the Service Node can include a centralized policy for both L2 functions and L3 functions, and the first CGW can integrate both L2 gateways and L3 gateways. Based on a floating IP address of the packet, the traffic is routed within the Service Node, the traffic being routed by an access BD from an ingress BD-VIF to an egress BD-VIF. The traffic is then routed from a second CGW that integrates both L2 gateways and L3 gateways to the destination VM.

20 Claims, 7 Drawing Sheets

ENHANCED SERVICE NODE NETWORK INFRASTRUCTURE FOR L2/L3 GW IN CLOUD

CROSS-REFERENCE TO RELATED APPLICATIONS

The present application claims priority to U.S. Provisional Application No. 63/494,413 filed on Apr. 5, 2023, which is hereby incorporated by reference in its entirety.

BACKGROUND

Networking systems can include both Layer 2 (L2) and Layer 3 (L3) functionalities. For example, a Data Center Interconnect (DCI) L3 Gateway (GW) and L2 GW can provide IP connectivity between multiple tenants while preserving both types of functionalities. However, the L2 GW and L3 GW are separate devices.

Some issues arise because of the separation between the L2 GW and L3 GW devices. For example, policy changes are inconvenient, clunky, and difficult to scale as the customer needs to download both the L2 policy into the L2 GW; and the L3 policy into the L3 GW. This makes it easy to introduce conflicts between L2 and L3 policies. Address Resolution Protocol (ARP) flooding can happen from the L2 GW to the L3 GW, and scaling the network is challenging as the customer needs to consider both L2 and L3 capabilities on different devices owned by different vendors. Moreover, if DCI wants to separate different tenants into different VRFs in the L3 GW, the network still needs to consider a technology to communicate between different VRFs, such as introducing VASI interfaces between two VRFs. However, a pair of VRF-Aware Software Infrastructure (VASI) interfaces can only communicate between two VRFs. What is needed are methods, systems, and routing techniques that solve the above issues.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure is directed to techniques for incorporating Layer 2 (L2) and Layer 3 (L3) functionality into a Service Node, which provides Internet protocol (IP) connectivity for devices connecting to a cloud network and centralized policies. Additionally and/or alternatively, the Service Node supports Address Resolution Protocol (ARP) suppression.

In one aspect, a method for managing Layer 2 (L2) and Layer 3 (L3) policies includes routing traffic from a first virtual machine (VM) to a first centralized gateway (CGW) within a Service Node through an L2 Virtual Extensible Local Area Network (VXLAN) fabric, where the Service Node can include a centralized policy for both L2 functions and L3 functions, and the first CGW can integrate both L2 gateways and L3 gateways. A source Internet Protocol (IP) address of the traffic is translated from a private IP address of the first VM to a floating IP address. Based on the floating IP address, the traffic is routed within the Service Node, the traffic being routed by an access Bridge-Domain (BD) from an ingress bridge-domain virtual interface (BD-VIF) to an egress BD-VIF. The floating IP address of the packet is translated to a private IP address of a destination VM, and the traffic is routed from a second CGW that integrates both L2 gateways and L3 gateways to the destination VM.

In another aspect, the traffic is routed from the first VM that belongs to a first hypervisor with a first private subnet to the first CGW of the Service Node. The traffic is switched, at the Access BD, from the ingress BD-VIF to the egress BD-VIF, where the ingress BD-VIF and the egress BD-VIF share the same Access BD. The traffic is then routed from the second CGW to the second VM through the L2 VXLAN fabric, where the second VM belongs to a second hypervisor with a second private subnet.

In another aspect, the traffic is routed from the first VM that belongs to a first hypervisor with a first private subnet to the first CGW of a first Service Node. The source Internet Protocol (IP) address of the traffic is translated from a private IP address of the first VM to a first floating IP address. The traffic is then routed to a first service gateway (SGW) through a first Access BD based on the first floating IP address, from the ingress BD-VIF to a first virtual routing and forwarding (VRF) of the first Service Node. The traffic is then forwarded from the first VRF of the first Service Node to a second VRF of a second Service Node through an L2/L3 VXLAN fabric. Finally, the traffic is routed from a second SGW through a second Access BD based on a target floating IP address, where the second Access BD routes the traffic from the second CGW to the second VM through a second L2 VXLAN fabric, where the second VM belongs to a second hypervisor with a second private subnet.

In another aspect, the method further includes receiving the traffic at a first VRF within the Service Node. Based on a failure to detect an adjacent target floating IP address, an address resolution protocol (ARP) stack is notified to trigger host detection for the target floating IP address. The target floating IP address is determined based on an ARP stack check of an Ethernet Virtual Private Network (EVPN) database, and an ARP entry is added into the first VRF.

In another aspect, the first CGW integration of both L2 gateways and L3 gateways within the Service Node further includes generating a well hierarchy, the well hierarchy including: a lower hierarchy including one or more customer VRFs, each customer VRF connected to a CGW and a BD-VIF; an intermediate hierarchy including the Access BD; and a topper hierarchy connected to one or more Access BDs.

In another aspect, the first CGW is attached into a first VRF and connects to the Access BD through a virtual L3 interface comprising a bridge-domain virtual interface (BD-VIF).

In one aspect, a system includes a Service Node, one or more virtual machines (VMs) in connection with the Service Node, and a processor for executing instructions stored in memory. Execution of the instructions by the processor manages Layer 2 (L2) and Layer 3 (L3) policies by routing traffic from a first virtual machine (VM) to a first centralized gateway (CGW) within a Service Node through an L2 Virtual Extensible Local Area Network (VXLAN) fabric, where the Service Node can include a centralized policy for both L2 functions and L3 functions, and the first CGW can integrate both L2 gateways and L3 gateways. A source Internet Protocol (IP) address of the traffic is translated from a private IP address of the first VM to a floating IP address. Based on the floating IP address, the traffic is routed within the Service Node, the traffic being routed by an access Bridge-Domain (BD) from an ingress bridge-domain virtual interface (BD-VIF) to an egress BD-VIF. The floating IP address of the packet is translated to a private IP address of a destination VM, and the traffic is routed from a second CGW that integrates both L2 gateways and L3 gateways to the destination VM.

In one aspect, one or more non-transitory computer-readable media include computer-readable instructions, which when executed by one or more processors, causes the controller to manage Layer 2 (L2) and Layer 3 (L3) policies by routing traffic from a first virtual machine (VM) to a first centralized gateway (CGW) within a Service Node through an L2 Virtual Extensible Local Area Network (VXLAN) fabric, where the Service Node can include a centralized policy for both L2 functions and L3 functions, and the first CGW can integrate both L2 gateways and L3 gateways. A source Internet Protocol (IP) address of the traffic is translated from a private IP address of the first VM to a source floating IP address. Based on the target floating IP address, the traffic is routed within the Service Node, the traffic being routed by an access Bridge-Domain (BD) from an ingress bridge-domain virtual interface (BD-VIF) to an egress BD-VIF. The target floating IP address of the packet is translated to a private IP address of a destination VM, and the traffic is routed from a second CGW that integrates both L2 gateways and L3 gateways to the destination VM.

Description of Example Embodiments

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1:
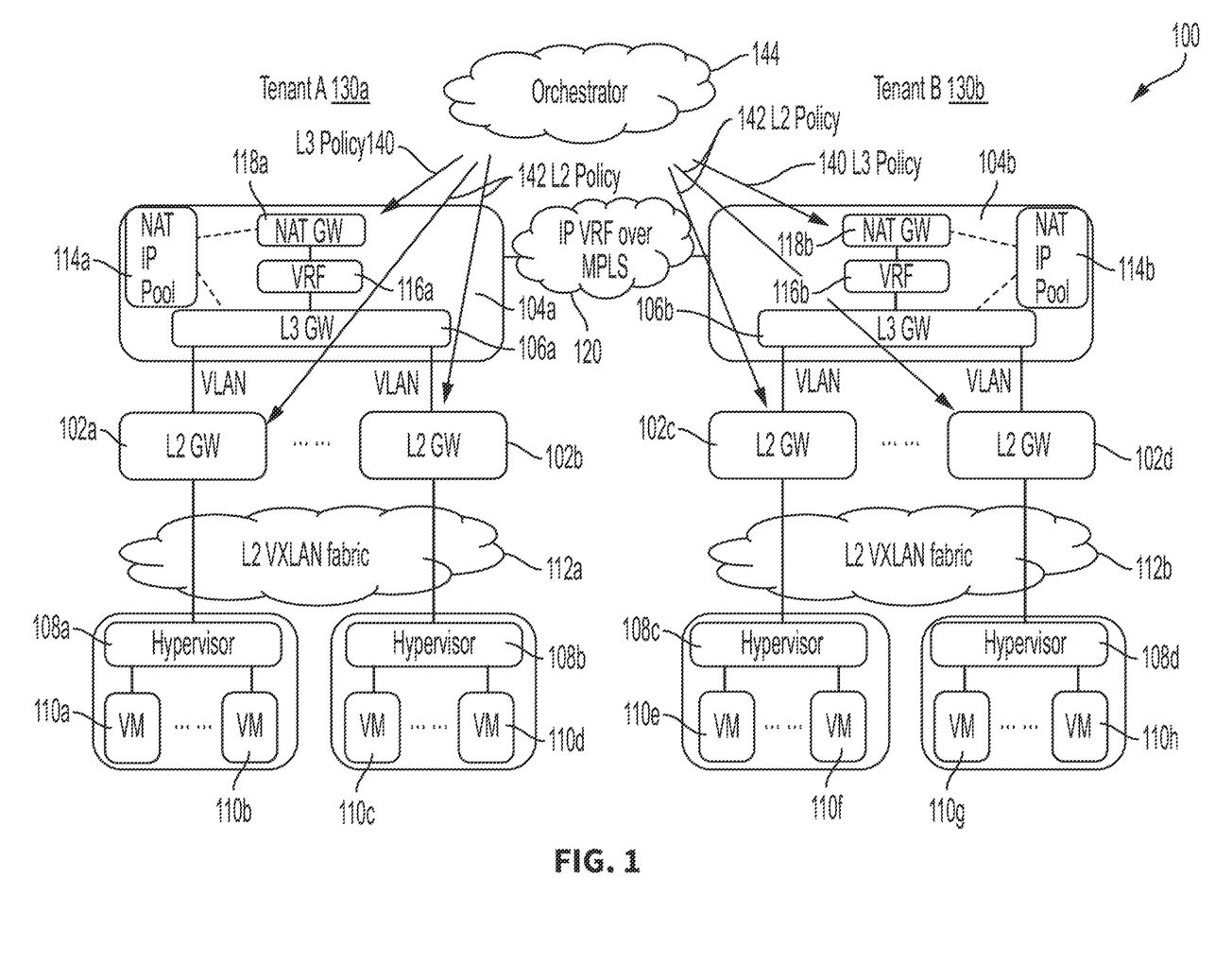
FIG. 1 illustrates an example networking system including a Data Center Interconnect (DCI) Layer 3 (L3) Gateway (GW) to provide IP connectivity between multi-tenants, in accordance with example embodiments.

FIG. 1 illustrates an example networking system including a Data Center Interconnect (DCI) Layer 3 (L3) Gateway (GW) to provide IP connectivity between multi-tenants, in accordance with example embodiments. In this example embodiment, before the addition of the Service Node, the L2 GW and L3 GW are separate devices.

System 100, for example, shows multiple tenants, Tenant A 130a and Tenant B 130b, although any number are contemplated. Tenant A 130a includes one or more Layer 2 (L2) gateway (GW) switches L2 GW 102a and L2 GW 102b, and a Layer 3 (L3) router 104a (e.g., for example, an ASR1K router), which can serve as a Data Center Interconnect (DCI) L3 Gateway 106a to provide IP connectivity between multi-tenants for which Data Centers provide service. The multi-tenant Data Centers use Virtual Extensible Local Area Network (VXLAN) encapsulation to carry the IP Virtual Routing and Forwarding (VRF) traffic of separate tenants. This is implemented by Ethernet Virtual Private Network (EVPN) based on L3 VXLAN encapsulation. In system 100, the bottom Hypervisors 108a, 108b hosting the Virtual Machines (VMs) 110a, 110b, 110c, and 110d connects to L2 GWs 102a, 102b with L2 VXLAN encapsulation (e.g., through the L2 VXLAN fabric 112a) and the L3 router 104a (ASR1K router) plays the L3 GW 106a role.

L3 router 104a further includes other components for routing between multi-tenants, such as a Network Address Translation (NAT) IP Pool 114a that includes a Virtual Routing and Forwarding (VRF) 116a and NAT GW 118a. The VRF 116a enables the simultaneous co-existence of multiple virtual routers (VRs) as instances or virtual router instances (VRIs) within the same router. For example, VRF 116a can allow users to configure multiple routing table instances to simultaneously co-exist within the same router. Overlapping IP addresses can be used without conflicting because the multiple routing instances are independent, and can select different outgoing interfaces. The NAT GW 118a can be used to enable instances present in a private subnet to help connect to the internet, such as through IP VRF Multiprotocol Label Switching (MPLS) 120. The NAT GW 118a can forward the traffic from instances present in the private subnet to the internet, and send back the response from the server back to the instance. When the traffic moves to the internet, an IPV4 address can get replaced with the NAT's device address. Once the response is obtained, it is sent to the instance, and in this case, the NAT device translates the address back to the IPV4 and it is given to the IPV4 address.

Tenant B 130b works similarly to Tenant A 130a. Tenant B 130b also includes one or more L2 GW switches, L2 GW 102c and L2 GW 102d, and L3 router 104b (e.g., for example, an ASR1K router), which can serve as an L3 Gateway 106b. VXLAN encapsulation carries the IP VRF traffic of separate tenants, and is implemented by EVPN based on L3 VXLAN encapsulation. The bottom Hypervisors 108c, 108d hosting the Virtual Machines (VMs) 110e, 110f, 110g, and 110h connects to L2 GWs 102c, 102d with L2 VXLAN encapsulation (e.g., through the L2 VXLAN fabric 112b) and the L3 router 104b (ASR1K router) plays the L3 GW 106b role.

Some issues arise within system 100 because of the separation between the L2 GW and L3 GW devices. For example, policy changes are inconvenient, clunky, and difficult to scale as the customer needs to download the L2 policy 142 into the L2 GWs 102a, 102b, 102c, and 102d; and L3 policy 140 into the L3 GWs 106a and 106b from the orchestrator 144. It is also easy to introduce conflicts between the L2 policy 142 and the L3 policy 140. This is a challenge to manage L2/L3 policies crossing so many devices in the DCI.

Moreover, there is an unexpected Address Resolution Protocol (ARP) flood packet from the L2 GW 102a to the L3 GW 106a.

The customer can also use the NAT functionality to translate the VM's 110a private IP address to a floating IP address. The L3 GW 106a forwards traffic with floating IP between different subnets. However, all the subnets are assigned to a same VRF, which is not well separated.

The separation of the L2 GW and L3 GW devices also makes it challenging to scale system 100 as the customer needs to consider both L2 and L3 capabilities on different devices owned by different vendors. Also, the VXLAN interworking in the control plane between different devices also needs to be considered.

Some solutions use a CGW (centralized gateway) to integrate the L2 GW 102a and L3 GW 106a in the CGW.

However, the CGW technique focuses on the enterprise edge or provider edge. Some solutions solve ARP flood issues in the CGW with an EVPN message. But that alone cannot solve the issues above.

Moreover, if DCI wants to separate different tenants into different VRFs in the L3 GW 106a, 106b, system 100 still needs to consider a technology to communicate different VRFs, such as introducing VASI interfaces between two VRFs. However, a pair of VRF-Aware Software Infrastructure (VASI) interfaces can only communicate two VRFs. And without the help of a control plane such as, but not limited to, EVPN or Switch Integrated Security Features (SISF), it is challenging to eliminate the ARP flooding issues.

Figure 2:
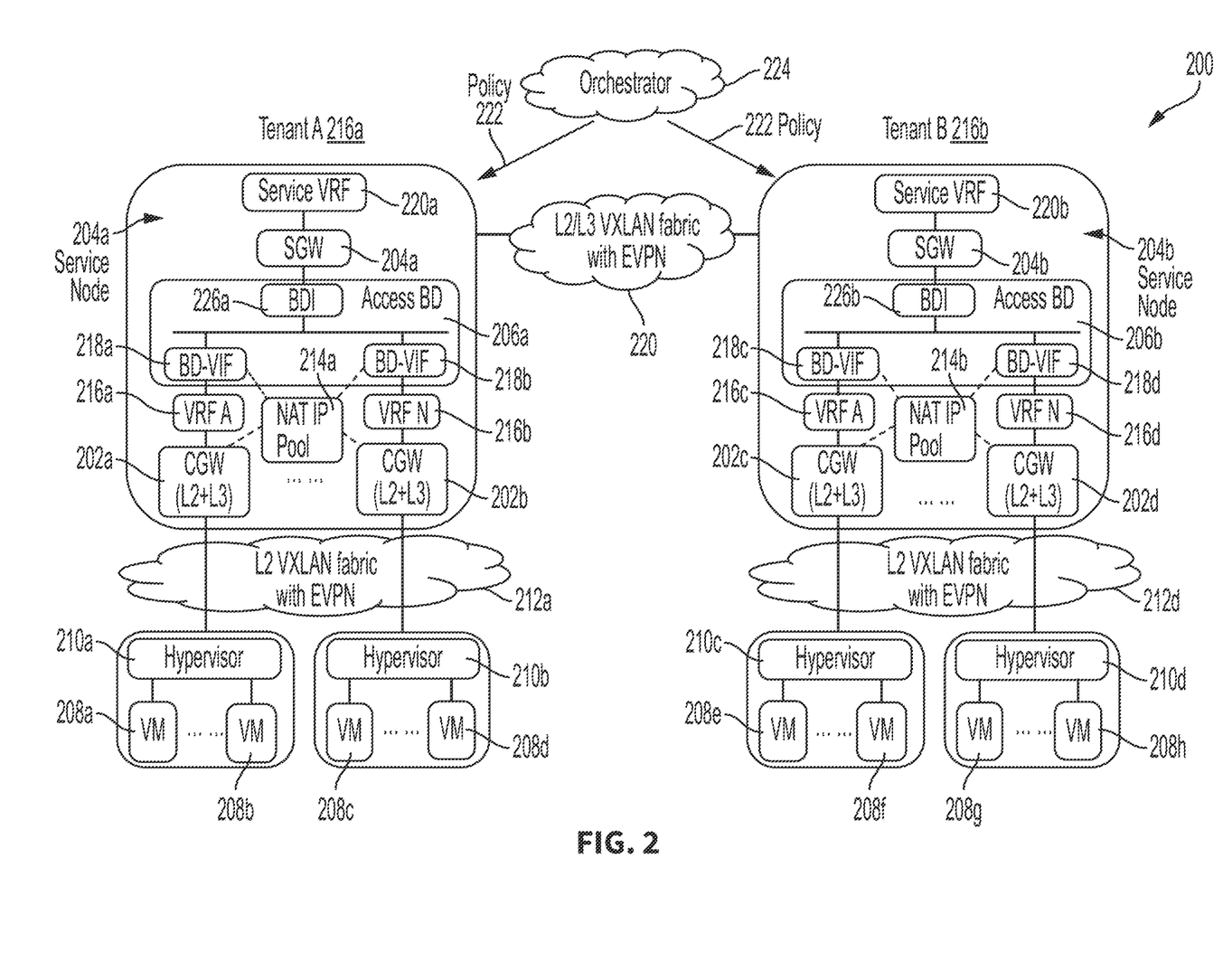
FIG. 2 illustrates an example networking system including a Service Node that integrates a Centralized Gateway (CGW), Service Gateway (SGW), and Network Address Translation (NAT) in the DCI, in accordance with example embodiments.

FIG. 2 shows an example embodiment that solves the described issues in FIG. 1 with systems and methods that focus on Cloud deployment. For example, systems and methods can focus on CGW and SGW integration named as Service Node 204a and 204b. In some embodiments, for example, a new DCI infra for Cloud deployment called the Service Node 204a can be provided, which integrates Centralized Gateways (CGW) 202a, 202b, 202c, and 202d; Service Gateway (SGW) 204a and 204b; and Network Address Translation (NAT) (e.g., NAT IP Pool 214a and 214b into the router. As the Service Node 204a and 204b integrates the L2 VXLAN functionality from the L2 GW device to the Service Node 204a and 204b, this new DCI infra can simplify the customer's topology and save the customer resources/money.

In some embodiments, Service Node 204a for Tenant A 216a includes an access Bridge-Domain (BD) 206a and 206b that communicates with VM hosts among different VRFs. Traffic can be routed from VM 208a to CGW 202a within Service Node 204a through L2 VXLAN fabric 212a, where the Service Node can include a centralized policy for both L2 functions and L3 functions, and CGW 202a can integrate both L2 gateways and L3 gateways.

In an example embodiment, the Access BD 206a, 206b can be in the intermediate layer and can be a special L2 switch in the Service Node 204a, 204b. Access BD 206a, 206b can connects SGW (service gateway) 204a, 204b and a scale of CGWs 202a, 202b, 202c, 202d, where each SGW 204a, 204b or CGW 202a, 202b, 202c, 202d has a dedicated L3 interface attached into the Access BD 206a, 206b. The SGW 204a, 204b interface can be, for example, a traditional BDI/SVI (bridge-domain interface/switch virtual interface). Each SGW 204a, 204b can connect to its respective Access BD 220a, 220b via BDI 226a, 226b. The CGW 202a, 202b, 202c, 202d interface can face Hypervisors 210a, 210b, which can host the VMs 208a and 208b, 208c and 208d, respectively. CGW 202a, 202b, 202c, 202d can be attached into the customer VRF 216a, 216b, 216c, 216d and connects to the Access BD 206a, 206b through a virtual L3 interface named as BD-VIF (bridge-domain virtual interface) 218a, 218b, 218c, 218d. The BD-VIF 218a, 218b, 218c, 218d belong to different VRFs due to design purpose and communicate with each other via L2 due to attaching into the same Access BD 206a. With it, the VRF leak issue can be solved inside the router (Service Node 204a). Not liking the VASI solution, it provides both L2 and L3 function with a terrific light-weight way, and there is no EVPN or other control message to support VRF leak.

In some embodiments, a source Internet Protocol (IP) address of the traffic can be translated from a private IP address of a VM (e.g., VM 208a) to a source floating IP address. Based on the target floating IP address, the traffic is routed within the Service Node 204a, the traffic being routed by the Access BD 206a from BD-VIF 218a to an egress BD-VIF 218b (intra-subnet traffic) or to a service VRF 220b (from service VRF 220a) (inter-subnet traffic). The target floating IP address of the packet is translated to a private IP address of a destination VM, and the traffic is then routed from a CGW that integrates both L2 gateways and L3 gateways to the destination VM. Traffic routed between Tenant A 216a and Tenant B 216b can traverse via the L2/L3 VXLAN fabric 220 with EVPN.

Policy changes are easy to implement and scale, as the customer simply needs to download the policy 222 into Service Node 204a, 204b from the orchestrator 224. This allows one source for policy changes, greatly removing potential conflicts between L2 policies and L3 policies.

In some embodiments, for example, to integrate the L2 GW and the L3 GW together into the Service Node 204a, the Service Node 204a can utilize the CGW 202a, 202b to design a well hierarchy. For example, the lower hierarchy can be a scale of Custom VRFs that are visible to the customer. A Customer VRF can connect to a scale of CGWs and a BD-VIF 218a, 218b. In the customer VRF, NAT translates a VM private IP to a VM floating IP for the source IP of the packet receiving from the CGW 202a, 202b and translate a VM floating IP to a VM private IP for the destination IP of the packet receiving from BD-VIF 218a, 218b. The intermediate hierarchy can be the Access BD 206a. The topper hierarchy can be the Service VRF 220a which is invisible to the customer. The Service VRF 220a can be used to route among the DCI infra. The Service VRF 220a can connect to a scale of SGWs and each SGW can connect to an Access BD via BDI.

After integrating the above, an enhanced Service Node 204a can be provided. With Service Node 204a, the orchestrator 224 only downloads a centralized policy to the Service Node 204a. It is also easy to extend the customer's service. The previous L2 GW turns to a pure underlay L2 switch which doesn't care about the policy change or can even be removed from the DCI infra later. The corresponding features in Tenant B 216b can work the same as in Tenant A 216a as described.

In some embodiments, in order to solve ARP flooding issues, a floating IP ARP suppression functionality can be provided in the Access BD 206a for VM's 208a, 208b floating IP by interworking ARP-alias and EVPN control plane. Additionally and/or alternatively, a well hierarchy method can be provided. For example, the lower hierarchy can be the customer VRFs (e.g., VRF 216a and VRF 216b) separating a customer's private subnets on different branches. The intermediate layer can be the Access BD 206a to communicate among different VRFs. The top hierarchy can be the Service VRF 220a to route traffic among inter-subnets of VM's floating IP. The scale on the Service Node 204a while deploying other fruitful features can be extended.

Some example embodiments can introduce an ARP-alias which statically configures the MAC address of a VM floating IP as a BD-VIF's (e.g., BD-VIF 218a) virtual MAC. An EVPN control plane can generate an RT2 MAC-IP route based on the VM floating IP and its static MAC of ARP-alias. The ARP suppression is completed with these RT2 MAC-IP routes of VM floating IPs. With the ARP-alias and EVPN control plane, the Service Node 204a can learn the RT2 MAC/IP route from the VM's floating IP and advertise it through BGP, which is called a host route. The Service Node 204a can also import the VM floating IP's host route into the topper (e.g., top) Service VRF 220a when it receives a remote RT2 MAC/IP route through BGP. As the EVPN control plane learns the RT2 MAC/IP route, it is available to implement ARP suppression on the Service Node 204a.

Additionally and/or alternatively, in some embodiments, a floating IP can also migrate from one Service Node 204a to another Service Node 204b. This is the mobility of VM floating IP and it is completed by the EVPN.

Figure 3:
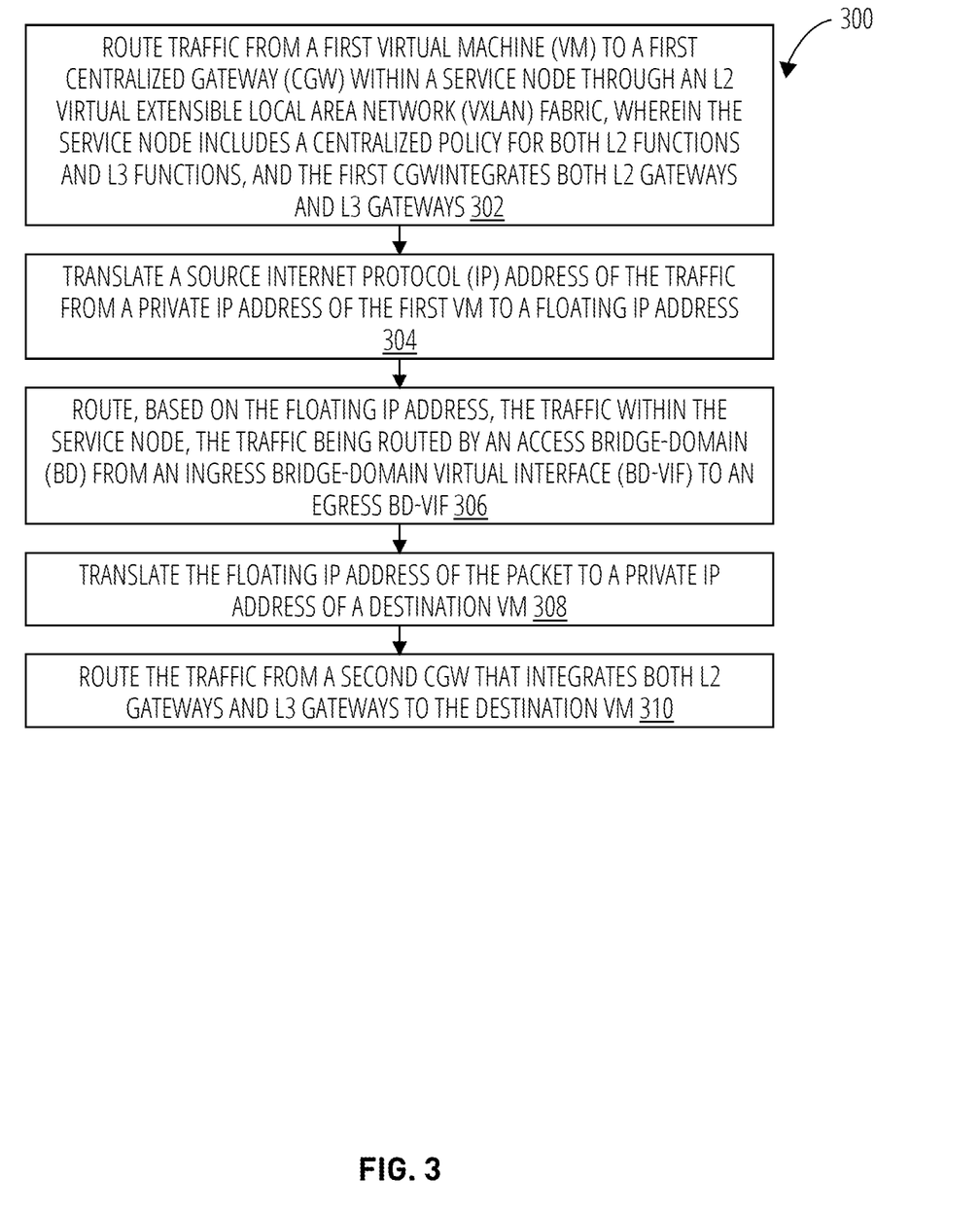
FIG. 3 illustrates a flowchart for a Service Node that integrates both L2/L3 GW functionalities in the DCI, in accordance with example embodiments.

FIG. 3 illustrates a flowchart for a Service Node that integrates both L2/L3 GW functionalities in the DCI, in accordance with example embodiments.

In block 302, the method 300 starts by routing traffic from a first virtual machine (VM) to a first centralized gateway (CGW) within a Service Node through an L2 Virtual Extensible Local Area Network (VXLAN) fabric, where the Service Node includes a centralized policy for both L2 functions and L3 functions, and the first CGW integrates both L2 gateways and L3 gateways. In some embodiments, the first CGW is attached into a first VRF and connects to the Access BD through a virtual L3 interface comprising a bridge-domain virtual interface (BD-VIF).

In block 304, the method 300 further translates a source Internet Protocol (IP) address of the traffic from a private IP address of the first VM to a floating IP address. In block 306, based on the floating IP address, the traffic is routed within the Service Node, the traffic being routed by the access BD from an ingress BD-VIF to an egress BD-VIF. In block 308, the floating IP address of the packet is translated to a private IP address of a destination VM. In block 310, the traffic is routed from a second CGW that integrates both L2 gateways and L3 gateways to the destination VM. For intra-subnet traffic, the traffic is routed by the Access BD 206a from ingress BD-VIF 218a to an egress BD-VIF 218b within Service Node 204a based on the floating IP address. The ingress BD-VIF 218a and the egress BD-VIF 218b share the same Access BD 206a. For inter-subnet traffic, the traffic being routed by the Access BD 206a from BD-VIF 218a to service VRF 220b from service VRF 220a based on the floating IP address. In some embodiments, a modification of the centralized policy can be applied to the traffic coming from VMs within different subnets after being distributed to the one or more Service Nodes 204a and 204b.

Figure 4:
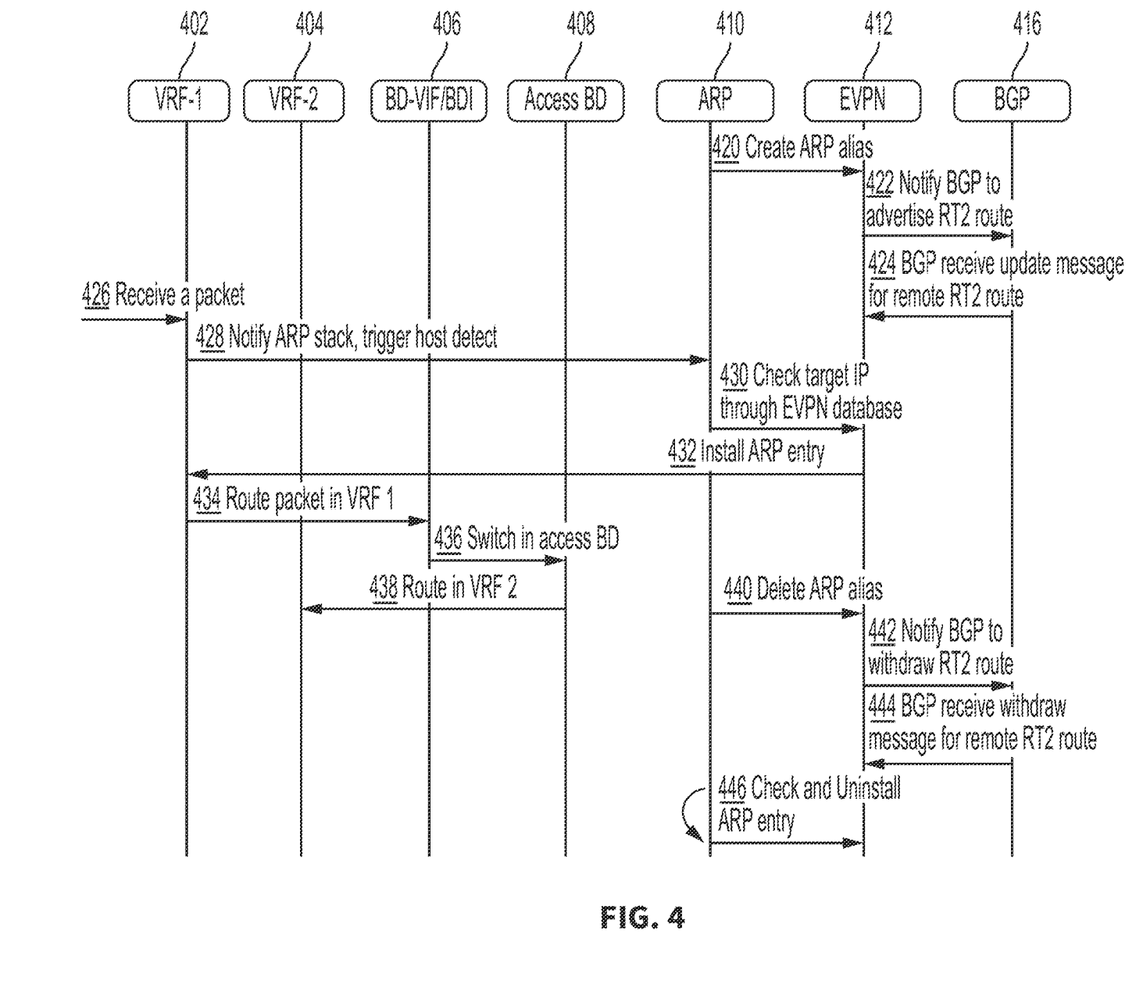
FIG. 4 illustrates an example workflow for Address Resolution Protocol (ARP) suppression, in accordance with example embodiments.

FIG. 4 illustrates an example workflow for Address Resolution Protocol (ARP) suppression, in accordance with example embodiments. In example embodiments, generally traffic is received at a VRF within the Service Node. Based on a failure to detect an adjacent target floating IP address, an address resolution protocol (ARP) stack is notified to trigger host detection for the target floating IP address. The target floating IP address is determined based on an ARP stack check of an Ethernet Virtual Private Network (EVPN) database, and an ARP entry is added into the first VRF.

An example ARP suppression workflow can follow an initial phase, an ARP suppression phase, and/or a clear phase. Shown in the example are VRF-1 402 (e.g., VRF 216a in FIG. 2), VRF-2 404 (e.g., VRF 216b in FIG. 2), BD-VIF/BDI 406 (e.g., BD-VIF 218a/218b and BDI 226a in FIG. 2), Access BD 408 (e.g., Access BD 206a in FIG. 1), ARP 410 stack, EVPN 412, and Border Gateway Protocol (BGP) 416.

In the Initial Phase, a Route Type 2 (RT2) MAC-IP route is installed in EVPN. In step 420, an ARP-alias entry is statically configured for a VM floating IP, mapping the VM floating IP to a BD-VIF's virtual MAC in a customer VRF. ARP 410 send a notification of this event to EVPN 412. In step 422, EVPN 412 creates a MAC-IP binding entry for the local VM floating IP, and then notifies BGP 416 to generate an RT2 MAC-IP route for this VM floating IP with the configured alias MAC. BGP 416 sends an update message to the BGP peer. In step 424, BGP 416 receives a remote VM floating IP's RT2 MAC-IP route from its peer, and BGP 416 notifies it to EVPN 412 and EVPN 412 installs a MAC-IP binding entry for the remote VM floating IP.

In the ARP suppression phase, VRF-1 402 receives a packet in step 426. In step 428, the packet is routed in VRF-1 402 and finds the out interface, but it fails to find the adjacency of the target floating IP. So, VRF-1 402 notifies ARP 410 stack to trigger host detection for the target floating IP. In step 430, the ARP 410 stack checks the target floating IP via the EVPN 412 database. If the MAC/IP binding entry for the target floating IP exists in EVPN 412, then in step 432 notification is sent to VRF-1 402 to install an ARP entry. In step 434, VRF-1 402 receives the later packet of the flow. The packet is routed in VRF-1 402. As the target floating IP's adjacency exists, so the packet is sent out from the BD-VIF 406. In step 436, the packet is switched in the Access BD 408 and sent out the target BD-VIF attached to VRF-2 404. The packet is routed in VRF-2 404 in step 438.

In the Clear phase, the RT2 MAC-IP route is uninstalled in EVPN 412. ARP 410 sends instruction to EVPN 412 to delete the local ARP-alias configuration in step 440. For example, the EVPN 412 can be notified to delete its MAC/IP binding entry for the VM floating IP in the ARP-alias. In step 442, EVPN 412 notifies BGP 416 to withdraw the RT2 MAC/IP route of the local VM floating IP. BGP 416, in step 444, receives a withdraw message for a remote RT2 MAC/IP route from the remote BGP peer. EVPN 412 can be notified to delete the MAC/IP binding entry for the remote VM floating IP. In step 446, the ARP 410 stack timer scans the installed ARP entry of a VM floating IP and verifies that this MAC/IP binding entry doesn't exist in EVPN 412. Therefore, the ARP 410 stack has uninstalled this ARP entry from VRF-1 402.

Figure 5:
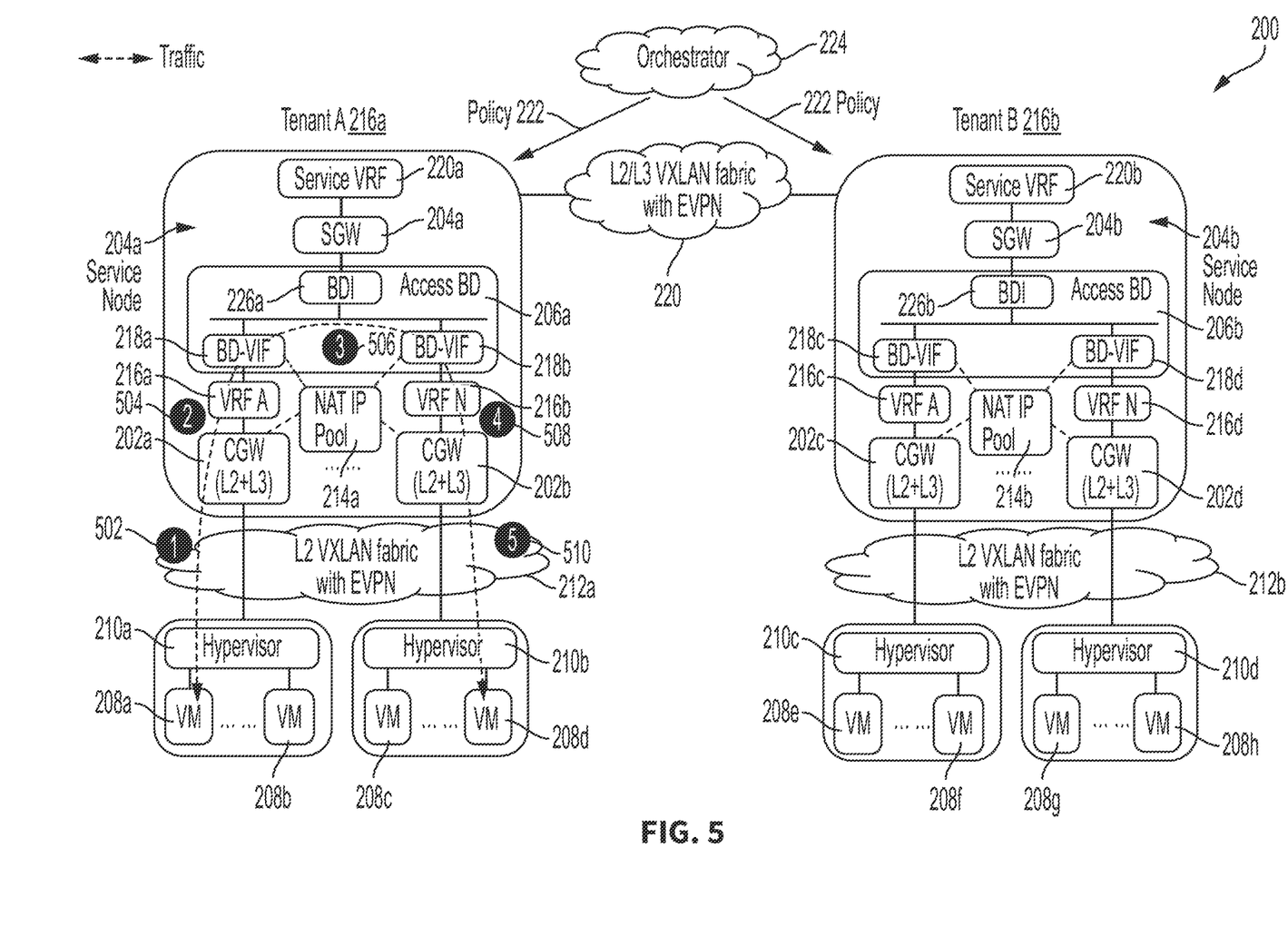
FIG. 5 illustrates an example floating internet protocol (IP) intra-subnet traffic in a Service Node, in accordance with example embodiments.

FIG. 5 illustrates an example floating internet protocol (IP) intra-subnet traffic in a Service Node, in accordance with example embodiments. FIG. 5 shows system 200 as discussed in FIG. 2. System 200 illustrates floating IP's intra-subnet traffic in Service Node 204a. In the example embodiment shown, for the data plane, the packet flow is switched through the Access BD 206a. For example, the traffic is routed from a first VM that belongs to a first hypervisor with a first private subnet to a first CGW of the Service Node 204a. The traffic is switched at the Access BD 206a from an ingress BD-VIF (BD-VIF 218a) to an egress BD-VIF (BD-VIF 218b). In this case, the ingress BD-VIF and the egress BD-VIF share the same Access BD 206a. The traffic is then routed from a second CGW (e.g., 202b) to a second VM (VM 208d) through the L2 VXLAN fabric 212a, where the second VM belongs to a second hypervisor (e.g., hypervisor 210b) with a second private subnet.

Traffic can be intra-subnet, for example, when two VMs belong to different Hypervisors, and the Hypervisors and/or VMs are in different private subnets. Their floating IP, for instance, are in the same floating subnet. They belong to a same Service Node. As shown in FIG. 5, the traffic's source IP is VM's 208a private IP and its destination IP is VM's 208d floating IP. In step 502, the traffic goes from VM 208a to the Service Node's 204a CGW 202a through the L2 VXLAN fabric 212a. At step 504, NAT translates the traffic's source IP from VM's 208a private IP to its floating IP. In step 506, the traffic goes into the Access BD 206a with an ingress interface of BD-VIF 218a and is switched to BD-VIF 218b. In step 508, the traffic goes tot VRF N 216b and NAT translates the target floating IP to VM's 208d private IP. Then the traffic is routed in the VRF N 216b. In step 510, the traffic is sent out from the CGW 202b. At last, the traffic ends at VM 208d through the L2 VXLAN fabric 212a.

Figure 6:
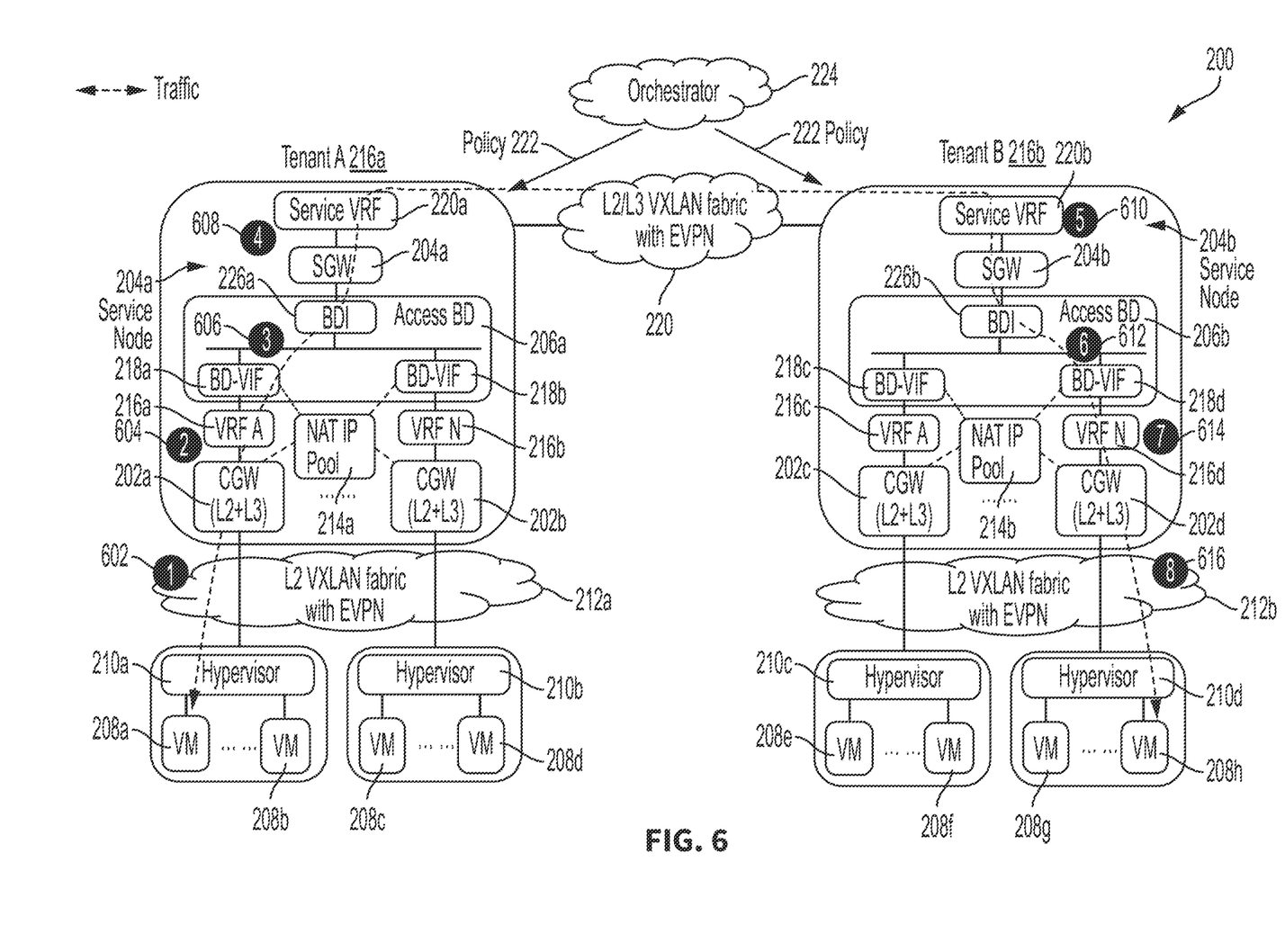
FIG. 6 illustrates an n example floating internet protocol (IP) inter-subnet traffic between Service Nodes, in accordance with example embodiments.

FIG. 6 illustrates an example floating internet protocol (IP) inter-subnet traffic between Service Nodes, in accordance with example embodiments. FIG. 6 shows system 200 as discussed in FIG. 2. In the example embodiment shown, two VMs belong to different Hypervisors, and they are in different private subnets. Their floating IP are in different floating subnets, and they belong to two Service Nodes. To route traffic between two VMs, traffic is routed from the first VM that belongs to a first hypervisor with a first private subnet to the first CGW of a first Service Node. The source Internet Protocol (IP) address of the traffic is translated from a private IP address of the first VM to a source floating IP address, and then traffic is routed to a first service gateway (SGW) through a first Access BD based on the target floating IP address, from the ingress BD-VIF to a first service virtual routing and forwarding (VRF) of the first Service Node. The traffic is forwarded from the first service VRF of the first Service Node to a second service VRF of a second Service Node through an L2/L3 VXLAN fabric, and the traffic is routed from a second SGW through a second Access BD based on the target floating IP address, wherein the second Access BD switches the traffic to an egress BD-VIF of the second Service Node. The target floating IP of the packet is translated to a private IP of the second VM and the packet is routed from the second CGW to the second VM through a second L2 VXLAN fabric, wherein the second VM belongs to a second hypervisor with a second private subnet.

In some embodiments, traffic flow is as follows: the traffic's source IP is VM's 208a private IP and its destination IP is VM's 208h floating IP. In step 602, the traffic goes from VM 208a to the Service Node's 204a CGW 202a through the L2 VXLAN fabric 212a. In step 604, NAT translates the traffic's source IP from VM's 208a private IP to its source floating IP. The traffic then goes into the Access BD 206a with an ingress interface of BD-VIF 218a and is switched to SGW 204a in step 606. In step 608, in the Service Node's 204a Service VRF 220a, the traffic is routed by the target floating IP's host route and goes to the Service Node 204b through L2/L3 VXLAN fabric 220. In the Service Node's 204b Service VRF 220b, the traffic is routed again by the target floating IP and finds SGW 204b as the output interface in the Service VRF 220b in step 610. In step 612, the traffic enters Access BD 206b. It is switched to BD-VIF 218d. In step 614, the traffic goes to VRF N 216d and NAT translates the target floating IP to the VM's 208h private IP. Then the traffic is routed in VRF N 216d. In step 616, the traffic is sent out from CGW 202d. At last, the traffic ends at VM 208h through the L2 VXLAN fabric 212b.

Overall, with a Service Node integrating CGW/SGW/NAT in the DCI cloud such as in FIG. 2, FIG. 5, and FIG. 6, there are many benefits. For example, the orchestrator only needs to consider a centralized policy into the Service Node. It does not need to consider various L2 GWs corresponding to those L2 switches owned by different vendors. The Service Node supports ARP suppression. It is easy for the customer to scale or extend its service on a Service Node as it integrates both L2/L3 GW functionalities. Because the VM sends a packet with L2 VXLAN encapsulation, it doesn't require the VXLAN interworking between the Service Node and the middle L2 switch. The Service Node utilizes the EVPN over L2 VXLAN technology, hence it has no limit of 4K VLAN, and it can learn and distribute VM host's RT2 MAC-IP route. It simplifies the DCI infra. The middle L2 switches become pure bridge devices. Previously they received L2 VXLAN packet from VM, handed off it to VLAN packet and delivered to the L3 GW, and vice versa. Now they do not need to do the extra hand off process. And finally, it provides a well hierarchy method with the lower hierarchy of the customer VRFs to separate customer's private subnets and the topper hierarchy of the Service VRF. The Access BD is proposed as a method to communicate traffic among Service VRF and customer VRFs.

Figure 7:
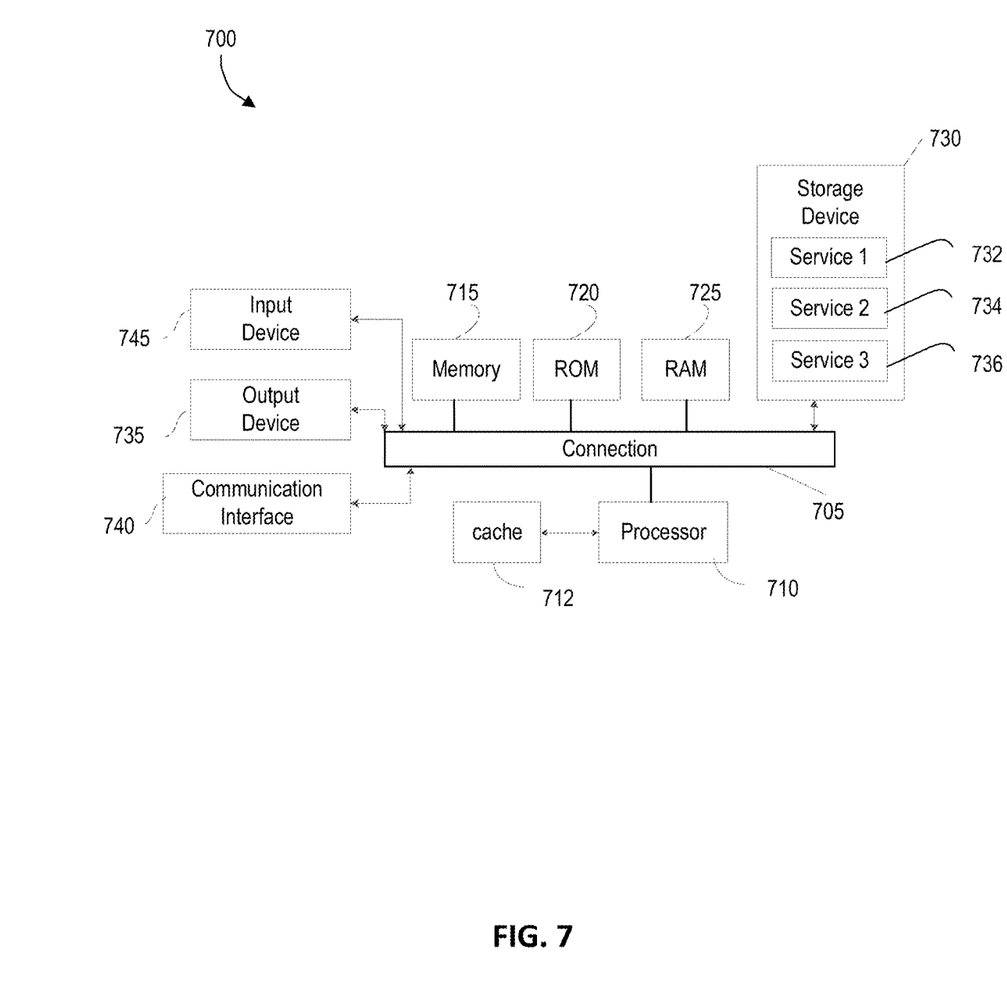
FIG. 7 shows an example of a computing system, according to some aspects of the present disclosure.

FIG. 7 shows an example of computing system 700, which can be for example any computing device or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) 720 and random access memory (RAM) 725 to processor 710. Computing system 700 can include a cache of high-speed memory 712 connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for managing Layer 2 (L2) and Layer 3 (L3) policies comprising:

routing traffic from a first virtual machine (VM) to a first centralized gateway (CGW) through an L2 Virtual Extensible Local Area Network (VXLAN) fabric, wherein the first CGW is included within a Service Node, wherein the Service Node includes a centralized policy for both L2 functions and L3 functions, and the first CGW integrates both L2 gateways and L3 gateways;

translating a source Internet Protocol (IP) address of the traffic from a private IP address of the first VM to a floating IP address;

routing, based on the floating IP address, the traffic within the Service Node, the traffic being routed by an access Bridge-Domain (BD) from an ingress bridge-domain virtual interface (BD-VIF) to an egress BD-VIF;

translating the floating IP address to a private IP address of a destination VM; and routing the traffic from a second CGW that integrates both L2 gateways and L3 gateways to the destination VM.

2. The method of claim 1, the method further comprising:

routing the traffic from the first VM that belongs to a first hypervisor with a first private subnet to the first CGW of the Service Node;

switching, at the Access BD, the traffic from the ingress BD-VIF to the egress BD-VIF, wherein the ingress BD-VIF and the egress BD-VIF share a same Access BD; and routing the traffic from the second CGW to the second VM through the L2 VXLAN fabric, wherein the second VM belongs to a second hypervisor with a second private subnet.

3. The method of claim 1, the method further comprising:

routing the traffic from the first VM that belongs to a first hypervisor with a first private subnet to the first CGW of a first Service Node;

translating the source Internet Protocol (IP) address of the traffic from a private IP address of the first VM to a first floating IP address;

routing the traffic to a first service gateway (SGW) through a first Access BD based on the first floating IP address, from the ingress BD-VIF to a first virtual routing and forwarding (VRF) of the first Service Node;

forwarding the traffic from the first VRF of the first Service Node to a second VRF of a second Service Node through an L2/L3 VXLAN fabric; and routing the traffic from a second SGW through a second Access BD based on a target floating IP address, wherein the second Access BD routes the traffic from the second CGW to the second VM through a second L2 VXLAN fabric, wherein the second VM belongs to a second hypervisor with a second private subnet.

4. The method of claim 1, the method further comprising:
receiving the traffic at a first VRF within the Service Node;
based on a failure to detect an adjacent target floating IP address, notifying an address resolution protocol (ARP) stack to trigger host detection for the target floating IP address;
determining the target floating IP address based on an ARP stack check of an Ethernet Virtual Private Network (EVPN) database; and
adding an ARP entry into the first VRF.

5. The method of claim 1, wherein the first CGW integrates both L2 gateways and L3 gateways within the Service Node further comprising:
generating a well hierarchy, the well hierarchy includes:
a lower hierarchy including one or more customer VRFs, each customer VRF connected to a CGW and a BD-VIF;
an intermediate hierarchy including the Access BD; and
a topper hierarchy connected to one or more Access BDs.

6. The method of claim 1, wherein a modification of the centralized policy can be applied to the traffic coming from VMs within different subnets after being distributed to one or more Service Nodes.

7. The method of claim 1, wherein the first CGW is attached into a first VRF and connects to the Access BD through a virtual L3 interface comprising a bridge-domain virtual interface (BD-VIF).

8. A system comprising:
a Service Node;
one or more virtual machines (VMs) in connection with the Service Node; and
a processor for executing instructions stored in memory, wherein execution of the instructions by the processor executes:
routing traffic from a first virtual machine (VM) to a first centralized gateway (CGW) through an L2 Virtual Extensible Local Area Network (VXLAN) fabric, wherein the first CGW is included within a Service Node, wherein the Service Node includes a centralized policy for both L2 functions and L3 functions, and the first CGW integrates both L2 gateways and L3 gateways;
translating a source Internet Protocol (IP) address of the traffic from a private IP address of the first VM to a floating IP address;
routing, based on the floating IP address, the traffic within the Service Node, the traffic being routed by an access Bridge-Domain (BD) from an ingress bridge-domain virtual interface (BD-VIF) to an egress BD-VIF;
translating the floating IP address to a private IP address of a destination VM; and
routing the traffic from a second CGW that integrates both L2 gateways and L3 gateways to the destination VM.

9. The system of claim 8, wherein execution of the instructions by the processor further executes:
routing the traffic from the first VM that belongs to a first hypervisor with a first private subnet to the first CGW of the Service Node;
switching, at the Access BD, the traffic from the ingress BD-VIF to the egress BD-VIF, wherein the ingress BD-VIF and the egress BD-VIF share a same Access BD; and routing the traffic from the second CGW to the second VM through the L2 VXLAN fabric, wherein the second VM belongs to a second hypervisor with a second private subnet.

10. The system of claim 8, wherein execution of the instructions by the processor further executes:
routing the traffic from the first VM that belongs to a first hypervisor with a first private subnet to the first CGW of a first Service Node;
translating the source Internet Protocol (IP) address of the traffic from a private IP address of the first VM to a first floating IP address;
routing the traffic to a first service gateway (SGW) through a first Access BD based on the first floating IP address, from the ingress BD-VIF to a first virtual routing and forwarding (VRF) of the first Service Node;
forwarding the traffic from the first VRF of the first Service Node to a second VRF of a second Service Node through an L2/L3 VXLAN fabric; and
routing the traffic from a second SGW through a second Access BD based on a target floating IP address, wherein the second Access BD routes the traffic from the second CGW to the second VM through a second L2 VXLAN fabric, wherein the second VM belongs to a second hypervisor with a second private subnet.

11. The system of claim 8, wherein execution of the instructions by the processor further executes:
receiving the traffic at a first VRF within the Service Node;
based on a failure to detect an adjacent target float IP address, notifying an address resolution protocol (ARP) stack to trigger host detection for the target floating IP address;
determining the target floating IP address based on an ARP stack check of an Ethernet Virtual Private Network (EVPN) database; and
adding an ARP entry into the first VRF.

12. The system of claim 8, wherein the first CGW integrates both L2 gateways and L3 gateways within the Service Node wherein execution of the instructions by the processor further executes:
generating a well hierarchy, the well hierarchy including:
a lower hierarchy include one or more customer VRFs, each customer VRF connected to a CGW and a BD-VIF;
an intermediate hierarchy include the Access BD; and
a topper hierarchy connected to one or more Access BDs.

13. The system of claim 8, wherein a modification of the centralized policy can be applied to the traffic come from VMs within different subnets after being distributed to one or more Service Nodes.

14. The system of claim 8, wherein the first CGW is attached into a first VRF and connects to the Access BD through a virtual L3 interface comprising a bridge-domain virtual interface (BD-VIF).

15. A non-transitory computer-readable storage medium, the computer-readable storage medium including instructions that when executed by a computer, cause the computer to:
route traffic from a first virtual machine (VM) to a first centralized gateway (CGW) through an L2 Virtual Extensible Local Area Network (VXLAN) fabric, wherein the first CGW is included within a Service Node, wherein the Service Node includes a centralized policy for both L2 functions and L3 functions, and the first CGW integrates both L2 gateways and L3 gateways;

translate a source Internet Protocol (IP) address of the traffic from a private IP address of the first VM to a floating IP address;

route, based on the floating IP address, the traffic within the Service Node, the traffic being routed by an access Bridge-Domain (BD) from an ingress bridge-domain virtual interface (BD-VIF) to an egress BD-VIF;

translate the floating IP address to a private IP address of a destination VM; and route the traffic from a second CGW that integrates both L2 gateways and L3 gateways to the destination VM.

16. The non-transitory computer-readable storage medium of claim 15, wherein the instructions further cause the computer to:

route the traffic from the first VM that belongs to a first hypervisor with a first private subnet to the first CGW of the Service Node;

switch, at the Access BD, the traffic from the ingress BD-VIF to the egress BD-VIF, wherein the ingress BD-VIF and the egress BD-VIF share a same Access BD; and route the traffic from the second CGW to the second VM through the L2 VXLAN fabric, wherein the second VM belongs to a second hypervisor with a second private subnet.

17. The non-transitory computer-readable storage medium of claim 15, wherein the instructions further cause the computer to:

route the traffic from the first VM that belongs to a first hypervisor with a first private subnet to the first CGW of a first Service Node;

translate the source Internet Protocol (IP) address of the traffic from a private IP address of the first VM to a first floating IP address;

route the traffic to a first service gateway (SGW) through a first Access BD based on the first floating IP address, from the ingress BD-VIF to a first virtual routing and forwarding (VRF) of the first Service Node;

forward the traffic from the first VRF of the first Service Node to a second VRF of a second Service Node through an L2/L3 VXLAN fabric; and route the traffic from a second SGW through a second Access BD based on a target floating IP address, wherein the second Access BD routes the traffic from the second CGW to the second VM through a second L2 VXLAN fabric, wherein the second VM belongs to a second hypervisor with a second private subnet.

18. The non-transitory computer-readable storage medium of claim 15, wherein the instructions further cause the computer to:

receive the traffic at a first VRF within the Service Node;

based on a failure to detect an adjacent target floating IP address, notifying an address resolution protocol (ARP) stack to trigger host detection for the target floating IP address;

determine the target floating IP address based on an ARP stack check of an Ethernet Virtual Private Network (EVPN) database; and add an ARP entry into the first VRF.

19. The non-transitory computer-readable storage medium of claim 15, wherein the first CGW integrates both L2 gateways and L3 gateways within the Service Node wherein the instructions further cause the computer to:

generate a well hierarchy, the well hierarchy including:

a lower hierarchy including one or more customer VRFs, each customer VRF connected to a CGW and a BD-VIF;

an intermediate hierarchy include the Access BD; and a topper hierarchy connected to one or more Access BDs.

20. The non-transitory computer-readable storage medium of claim 15, wherein a modification of the centralized policy can be applied to the traffic come from VMs within different subnets after being distributed to one or more Service Nodes.

* * * * *